United States Patent
Jhon et al.

(10) Patent No.: US 9,124,067 B2
(45) Date of Patent: Sep. 1, 2015

(54) PULSE LASER APPARATUS

(71) Applicant: KOREA INSTITUTE OF SCIENCE AND TECHNOLOGY, Seoul (KR)

(72) Inventors: Young Min Jhon, Seoul (KR); Joon Mo Ahn, Seoul (KR); Jae Hun Kim, Seoul (KR); Seok Lee, Seoul (KR); Min Chul Park, Seoul (KR); Deok Ha Woo, Seoul (KR); Young Tae Byun, Gyeonggi-do (KR); Taik Jin Lee, Seoul (KR); Sun Ho Kim, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 14/448,227

(22) Filed: Jul. 31, 2014

(65) Prior Publication Data

US 2015/0049775 A1    Feb. 19, 2015

(30) Foreign Application Priority Data

Aug. 14, 2013   (KR) .......................... 10-2013-0096572

(51) Int. Cl.
  *H01S 3/11*   (2006.01)
  *H01S 3/117*  (2006.01)
  *H01S 3/106*  (2006.01)

(52) U.S. Cl.
  CPC . *H01S 3/117* (2013.01); *H01S 3/11* (2013.01); *H01S 3/1106* (2013.01); *H01S 3/1062* (2013.01); *H01S 3/1109* (2013.01)

(58) Field of Classification Search
  CPC ......... H01S 3/117; H01S 3/11; H01S 3/1106; H01S 3/1109; H01S 3/1062
  USPC ............................................. 372/13, 25, 101
  See application file for complete search history.

(56) References Cited

U.S. PATENT DOCUMENTS 5,673,281 A * 9/1997 Byer .................................. 372/3
2009/0304033 A1 * 12/2009 Ogilvy et al. ................... 372/10

FOREIGN PATENT DOCUMENTS

KR          101153382 B1     6/2012

OTHER PUBLICATIONS

RP Photonics Encyclopedia.*
Rudiger Paschotta, RP Photonic Encyclopedia, Oct. 2008, WILEY-VCH.*
The Aesthetic Guide; "Picoseconde laser shows promise for new era in tatoo removal" Dermatology Times, Published Aug. 1, 2012; 1 page.

* cited by examiner

Primary Examiner — Armando Rodriguez
(74) Attorney, Agent, or Firm — Ladas & Parry LLP

(57) ABSTRACT

Provided is a pulse laser apparatus for generating laser light. The apparatus includes a first mirror and a second mirror which are disposed at both ends of a resonator and configured to reflect the laser light, a gain medium disposed between the first and second mirrors and configured to amplify and output light incident from an outside, an etalon configured to adjust a pulse width of the laser light, and an acousto-optic modulator disposed between the first and second mirrors and configured to form a mode-locked and Q-switched signal from the laser light, in which some of the laser light is output through either the first or second mirror to outside the resonator.

8 Claims, 4 Drawing Sheets

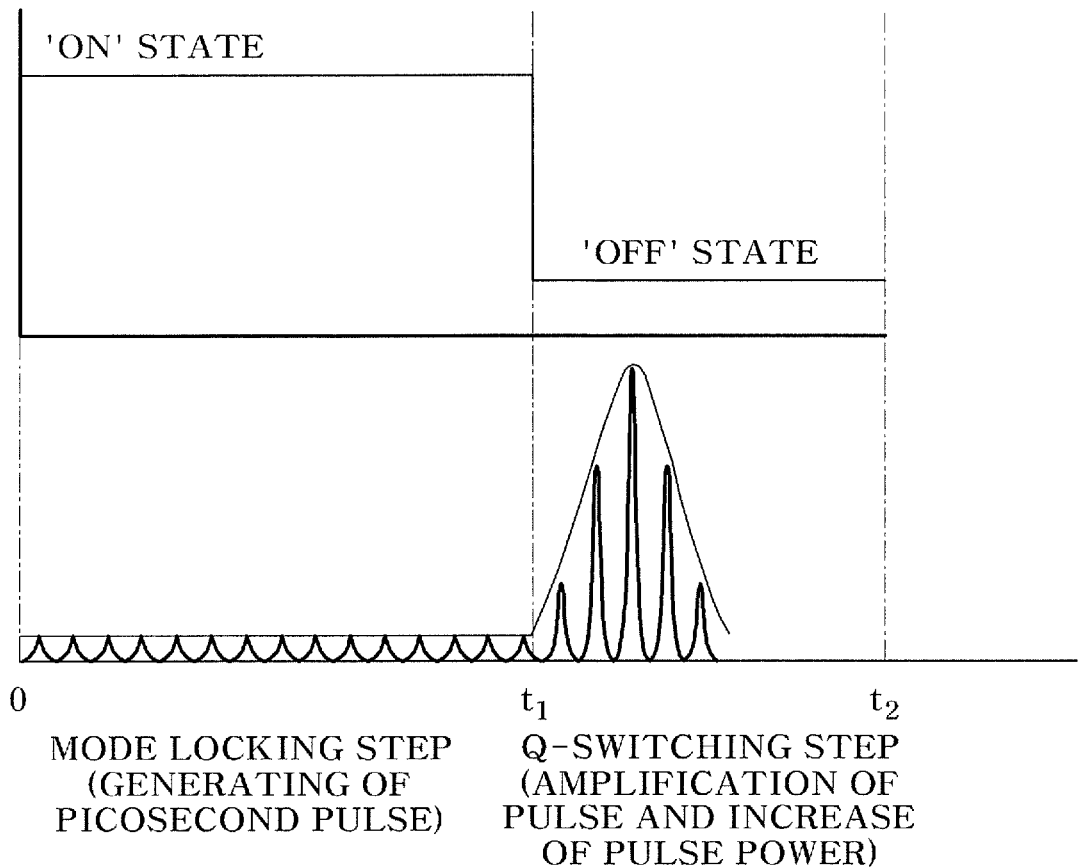

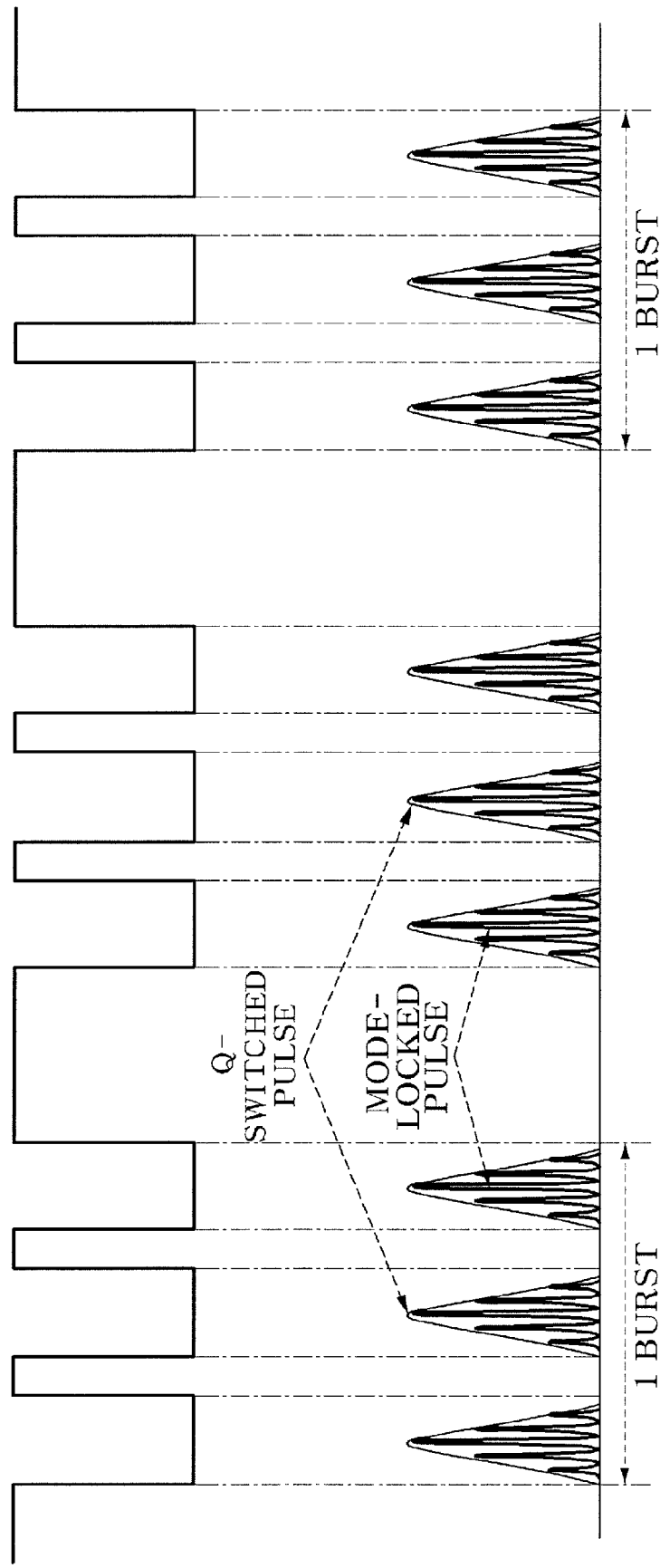

PULSE LASER APPARATUS

CROSS-REFERENCE TO RELATED APPLICATION

This application claims priority to and the benefit of Korean Patent Application No. 2013-0096572, filed on Aug. 14, 2013, the disclosure of which is incorporated herein by reference in its entirety.

BACKGROUND

1. Field of the Invention

The present invention relates to a laser apparatus, and more particularly, to a pulse laser apparatus that may adjust a laser pulse width and output pulse energy.

2. Discussion of Related Art

Recently, lasers have been widely used in medical treatment, and medical treatment apparatuses using such lasers have been used in dermatological, ophthalmic, dental, and surgical operations. In general, the laser treatment apparatus in a dermatology clinic is used to treat a lesion such as a skin disease and a blood vessel disease by radiating a laser having a uniform wavelength and intensity. Various types of lasers are used for treatment in a dermatology clinic. A Q-switched Alexanderite laser (operating at 755 nm) is mainly used to remove a spontaneous dermatological pigmentation or tattoo. A long pulse ruby laser is used to remove hair, and an Nd:YAG laser (operating at 1060 nm), a $CO_2$ laser (operating at 10.6 µm) and an argon laser (operating in the range of 488 nm to 514 nm) are used to treat a dilated vessel.

Specifically, in a dermatology clinic, laser treatment apparatuses are used to solve various dermatological problems such as mottled spots, dilated vascular disorders, and pigmentation disorders including tattoos. The laser treatment apparatuses locally apply heat to raise a temperature such that component proteins may be denatured or a pigment may be dispersed. In this case, a pulse width of the radiated laser light is a critical factor. When the pulse width is too long, absorbed heat is dispersed into adjacent tissues such that heat may not be selectively applied to a desired degree. However, when the pulse width is too short, light absorption chemical substances such as a hemoglobin or a tattoo color particle is heated and vaporized too quickly. Accordingly, a suitable pulse width needs to be matched with a thermal diffusion time of a target point. A phenomenon in which a target generates heat by absorbing radiated light is referred to as a photothermal effect. A light source optimized for this is a Q-switched laser having a pulse width of several tens to hundreds of nanoseconds.

According to recent clinical trials, it can be seen that a picosecond pulse generated through mode locking allows for effectively removing a tattoo or pigmentation disorder and preventing a scar, as compared to a nanosecond pulse generated through an existing Q-switching. The picosecond pulse may be applied more shallow to a small area by using a photomechanical effect, which can be applied more selectively than the photothermal effect, thus reducing a treatment time and minimizing a scar or side effect. However, in order to perform the mode-locking for acquiring a short picosecond pulse, a separate fast optical modulator is needed in addition to a Q-switch modulator.

FIG. 1 is a basic block diagram illustrating a mode-locked and Q-switched Alexanderite laser apparatus according to conventional technology.

Referring to FIG. 1, a laser apparatus include a resonator that generates a laser, and the resonator includes a first mirror, a second mirror, a gain medium, and two optical modulators (a first optical modulator and a second optical modulator) arranged therein along an optical axis.

One of the first mirror and the second mirror disposed at both ends of the resonator is a fully reflective mirror with total reflection, and the other is a partially reflective mirror. Laser light generated in the resonator is output through the partially reflective mirror. The laser pulse from the gain medium to the second mirror passes through the second optical modulator and is reflected by the second mirror, and then passes through the second optical modulator, the gain medium, and the first optical modulator to the first mirror. In this case, the second optical modulator serves to generate a mode-locked pulse, and the first optical modulator serves to generate a Q-switched pulse. The laser light oscillated within the resonator is output to the outside along an output path when the laser light has a desired magnitude.

It is very useful to appropriately change a laser pulse width depending on a type or state of a lesion in the clinical environment. However, conventional mode-locked laser treatment apparatuses generally have a fixed pulse width of a laser for treating skin pigmentation or injury, and thus it is difficult to change the pulse width in any desired way.

In order to perform mode-locking and Q-switching in the conventional technology, the laser resonator should include two optical modulators. In particular, an electro-optic modulator, which is widely used, requires a high-cost and complicated electric circuit because a driving signal obtained by modulating a high voltage of several kV in nanoseconds should be used to drive the electro-optic modulator.

SUMMARY OF THE INVENTION

The present invention is directed to a pulse laser apparatus that may adjust a mode-locked laser pulse width of picoseconds, perform a pulse burst operation in addition to mode-locking and Q-switching operations by using an optical modulator, and use a modulator operated with a low voltage driving signal.

According to an aspect of the present invention, there is provided a pulse laser apparatus for generating laser light, the pulse laser apparatus including: a first mirror and a second mirror disposed at both ends of a resonator and configured to reflect the laser light, a gain medium disposed between the first and second mirrors and configured to amplify and output light incident from an outside, and an acousto-optic modulator disposed between the first and second mirrors and configured to form a mode-locked and Q-switched signal from the laser light, in which some of the laser light is output through either the first or second mirror to outside the resonator.

The pulse laser apparatus according to another aspect of the present invention may further include an etalon configured to adjust a pulse width of the laser light.

The etalon may be a parallel-plane plate having a uniform reflectivity, the parallel-plane plate being an optical device having an increased reflectivity by depositing a dielectric multi-layered thin film on one or both sides of a parallel-plane plate of glass or crystal, and a wavelength width of the laser light may be adjusted by a reflectivity, a thickness, and a refractive index of the etalon, by limiting a transmittance wavelength bandwidth when the laser light is transmitted to the etalon.

The etalon may be provided as at least one etalon, and the pulse width of the laser light may be adjusted by selectively using the etalons having different properties inside or outside the resonator. In particular, when the etalon is disposed inside the resonator, laser light is repetitively transmitted within the resonator, thus giving the same effect as the etalon of high reflectivity even when both sides of the etalon have a low reflectivity. The pulse width may be adjusted in a range of 10 ps to 10 ns.

The gain medium may include an Alexanderite rod.

The laser light may be mode-locked by applying an ON voltage signal (a signal having an RF frequency corresponding to a round trip time of the resonator) to the acousto-optic modulator for a certain time t1 to use a periodical insertion loss by diffracted light. The laser light may be Q-switched to amplify a mode-locked pulse train to acquire a high-power output by applying an OFF voltage signal to the acousto-optic modulator for a certain time t2-t1 to reduce an average insertion loss of the resonator. A certain number of mode-locked and Q-switched laser pulses may be output in a pulse burst mode by periodically adjusting the ON and OFF voltage signals and applying the adjusted ON and OFF voltage signals to the acousto-optic modulator.

When some of the laser light is output through either the first mirror or second mirror, the number of the output Q-switched pulses may be adjusted by using a burst mode or shutter.

BRIEF DESCRIPTION OF THE DRAWINGS

The above and other objects, features, and advantages of the present invention will become more apparent to those of ordinary skill in the art by describing in detail exemplary embodiments thereof with reference to the accompanying drawings, in which:

FIG. 5 is a graph illustrating a process of sequentially implementing mode-locking and Q-switching by using one acousto-optic modulator; and FIG. 6 is a graph illustrating an example in which a mode-locked and Q-switched pulse is generated in a burst mode by a medical laser apparatus.

DETAILED DESCRIPTION OF EXEMPLARY EMBODIMENTS

Hereinafter, preferred embodiments of the present invention will be described in detail with reference to the accompanying drawings. However, the following embodiments are provided for those skilled in the art to fully understand the present invention and thus may be embodied in different forms. Accordingly, the present invention should not be construed as limited to the embodiments set forth herein.

Figure 1:
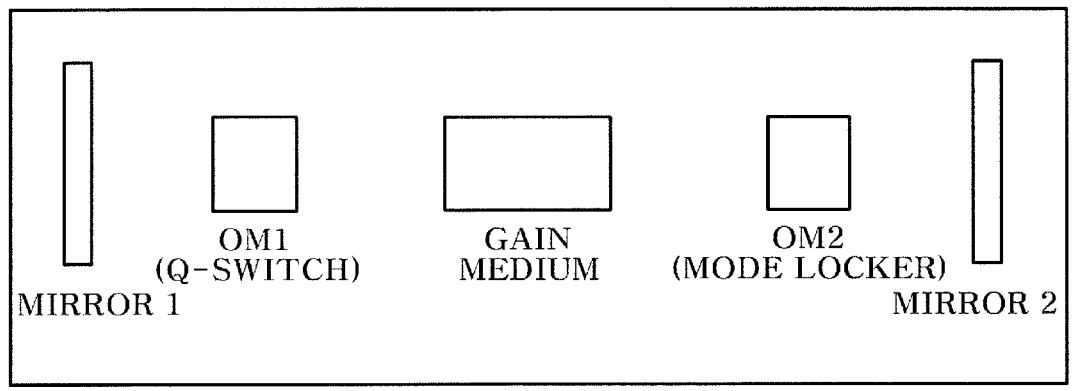
FIG. 1 is a basic block diagram illustrating a laser apparatus according to the conventional technology.
Figure 2:
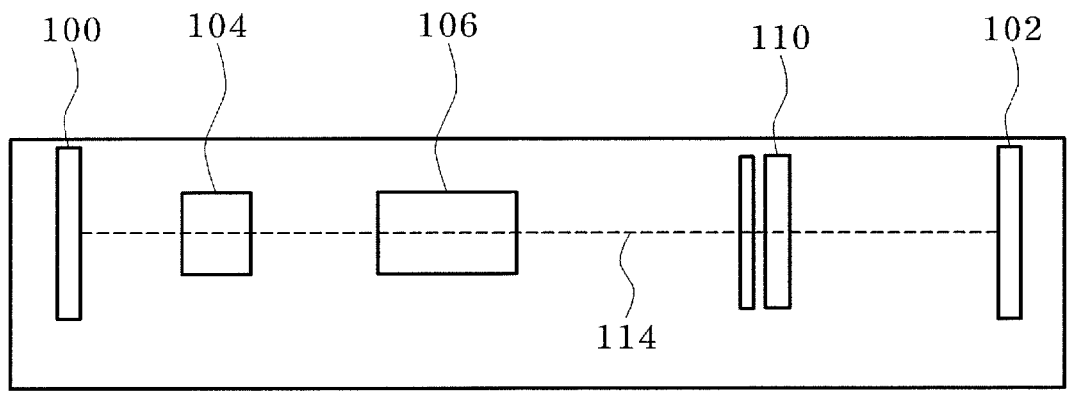
FIG. 2 is a basic block diagram illustrating a laser apparatus according a preferred embodiment of the present invention.

FIG. 2 shows a laser apparatus according a preferred embodiment of the present invention. The laser apparatus according to the preferred embodiment of the present invention includes a first mirror 100, a second mirror 102, an acousto-optic modulator 104, a gain medium 106, and an etalon 110.

The first mirror 100 and the second mirror 102 are disposed at both ends of the laser apparatus. One of the first mirror 100 and the second mirror 102 is a fully reflective mirror with total reflection, and the other is a partially reflective mirror. Laser light oscillated in the resonator is output through the partially reflective mirror.

The gain medium 106 is a material having a density inverted through pumping. Light incident from the outside to the material is amplified and then output with a high power. A pumping device used in the outside may include a flash lamp, an arc lamp, or another laser apparatus. The gain medium may include an alexandrite or titanium-doped sapphire crystal rod, a neodymium-doped yttrium aluminum Nd:YAG crystal rod, and so on.

For example, when light is emitted to the gain medium 106 using a pumping lamp, light excited in the gain medium 106 passes through the etalon 110 along an optical axis 114 and is reflected by the second mirror 102. Then, the light sequentially passes through the etalon 110, the gain medium 106, and the acousto-optic modulator 104 and is reflected by the first mirror 100.

The etalon 110 acts to adjust a pulse width of the laser light. The etalon 110 is a parallel-plane plate having a uniform reflectivity, and more particularly, an optical device having an increased reflectivity by depositing a dielectric multi-layered thin film on one or both sides of a parallel-plane plate of glass or crystal.

Figure 3:
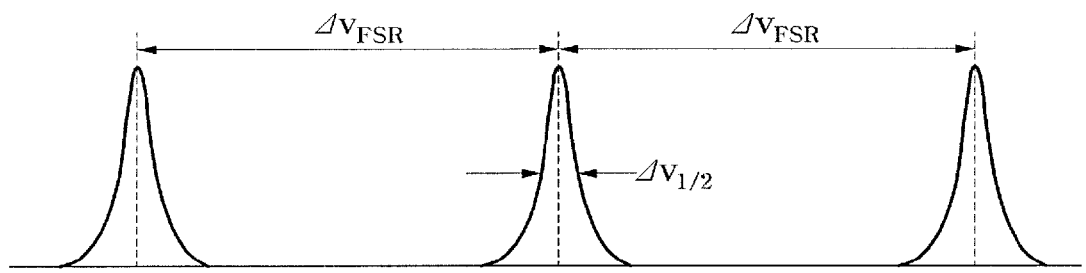
FIG. 3 is a conceptual view illustrating that an etalon shown in FIG. 2 adjusts a pulse width of laser light.

FIG. 3 is a conceptual view illustrating that an etalon of the present invention adjusts a pulse width of laser light. Referring to FIG. 3, when the laser light is transmitted to the etalon, a transmission wavelength width of the laser light is limited according to a reflectivity, a thickness, and a refractive index, thus adjusting the pulse width.

Here, a degree of freedom in the adjustment of the pulse width of the laser light may be increased by adjusting the number of etalons. For example, it is preferable to freely adjust a laser pulse width for a medical laser in a range of 10 ps to 10 ns.

When the etalon is disposed outside the laser resonator (extra-cavity), laser passes through the etalon only one time and thus is required to have a very high reflectivity in order to form a desired pulse width. Otherwise, when the etalon is disposed inside the laser resonator (intra-cavity), the laser sufficiently travels back and forth inside the resonator even when a simple parallel-plane plate-type etalon having a small reflectivity of about 4% with no dielectric thin film is used on both sides, thus giving the same effect as the etalon of high reflectivity that is disposed outside the resonator.

Critical parameters for adjusting a pulse width by the etalon include a frequency transmission bandwidth $\Delta v_{1/2}$, a reflectivity R, and a thickness d, thus generating a light wave having the pulse width $\Delta \tau$ that is changed by the etalon (see Equations 1, 2, and 3; A case in which the etalon is disposed outside the resonator).

$$F = \frac{\pi \sqrt{R}}{1-R} : \text{Finesse} \quad \text{[Equation 1]}$$

(R: Reflectivity)

$$\Delta v_{1/2} = \frac{\Delta v_{FSR}}{F} : \text{Frequency transmission bandwidth} \quad \text{[Equation 2]}$$

($\Delta v_{FSR}$: Free spectral range)

$$\Delta v_{FSR} = \frac{c}{2nd} \quad (d: \text{Thickness}, n: \text{Refractive index})$$

$$\Delta \tau = \frac{0.44}{\Delta v_{1/2}} = \left[\frac{0.44}{c} \cdot 2 \text{ nF}\right] \cdot d \text{ (Gaussian pulse)} \quad \text{[Equation 3]}$$

Figure 4:
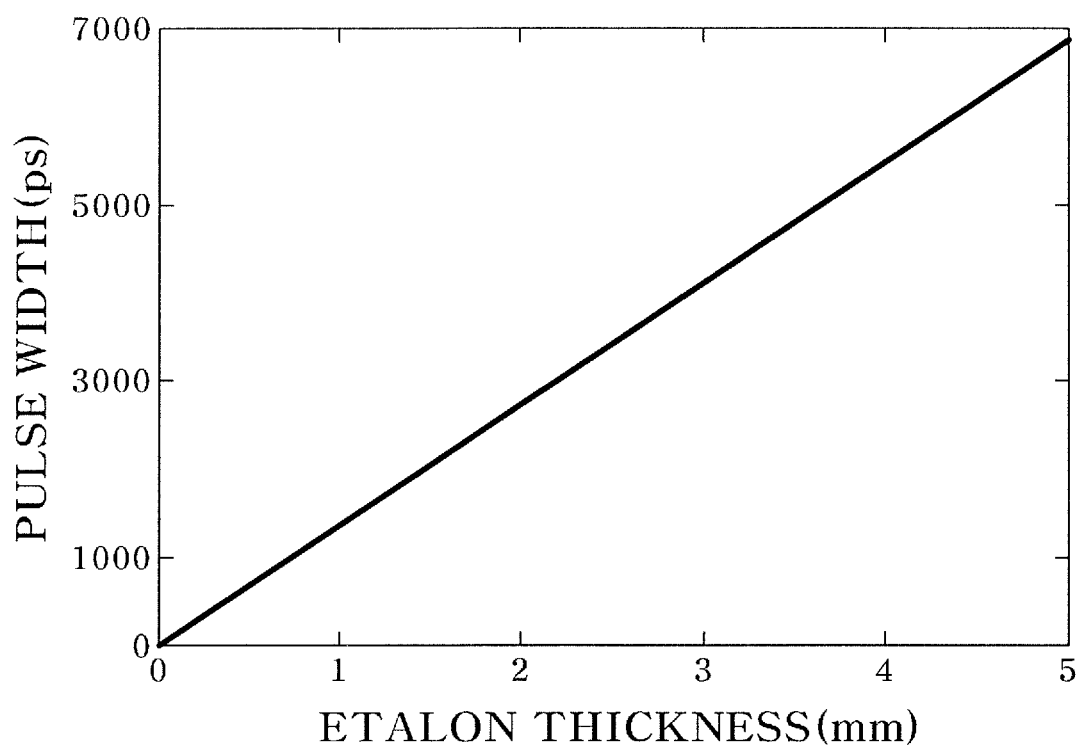
FIG. 4 is a graph illustrating a pulse width that varies according to a thickness of an etalon.

Accordingly, according to the above Equations, the pulse width may be changed by the etalon. FIG. 4 is a graph illustrating a pulse width varying with a thickness of an etalon when a pulse has a Gaussian form and the etalon has a refractive index of 1.5.

FIG. 5 is a graph illustrating a process of sequentially implementing mode-locking and Q-switching by using one acousto-optic modulator.

FIG. 6 is a graph illustrating an example in which a mode-locked and Q-switched pulse is generated in a burst mode by a medical laser apparatus.

Referring to FIGS. 5 and 6, the mode-locking, the Q-switching, and the burst operation may be implemented by an ON-OFF of an RF voltage signal applied to the acousto-optic modulator. Specifically, when the RF voltage signal applied to the acousto-optic modulator is in an ON state, a mode-locked pulse is formed by a periodic loss of the acousto-optic modulator. When the RF voltage signal applied to the acousto-optic modulator is in an OFF state, an average loss of the resonator is reduced, and thus a high-power mode-locked pulse train is output in the form of a Q-switched pulse. When the RF voltage signal applied to the acousto-optic modulator is repeatedly turned on and off to apply a desired number of Q-switched pulses (one burst) to the acousto-optic modulator, one burst of mode-locked and Q-switched pulses is formed. By repeating this process, a desired number of burst signals may be obtained.

Several mode-locked pulses are grouped together to form one Q-switched pulse. When an adjustment of the number of output pulses is performed on the Q-switched pulse by using the burst mode or electrical shutter, a laser light may be output in a pulse burst mode in which several pulses are output as a group. In this case, the output laser energy may be controlled by the number of output pulse bursts per unit time.

According to the embodiment of the present invention, the acousto-optic modulator 104 serves to generate a mode-locked signal and also serves to perform Q-switching at a desired repetition rate and output a pulse in a burst mode.

When laser light is formed inside the laser resonator to have a mode-locked and Q-switched pulse, the laser light pulse is output through either a first mirror 100 or second mirror 102. Specifically, the first mirror or second mirror has a transmittance in a range of about 1% to 90%, and thus some light waves in the laser resonator may be reflected while other light waves may be output through either the first mirror or second mirror.

According to the embodiment of the present invention, the pulse laser apparatus may select a suitable mode-locked pulse width and an output energy according to the purpose of treatment in the case of a use in a medical laser. Furthermore, an acousto-optic modulator may be driven with a significantly low voltage (operating with several V), compared to an electro-optic modulator (operating with several kV) and thus does not need an expensive fast high-voltage electric device. Thus it is also possible to reduce power consumption of the apparatus, reduce a volume of a power part of the apparatus, and also prevent a frequency chirp that occurs when using the electro-optic modulator.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pulse laser apparatus for generating laser light, the pulse laser apparatus comprising:
    a first mirror and a second mirror disposed at both ends of a resonator and configured to reflect the laser light;
    a gain medium disposed between the first and second mirrors and configured to amplify and output light incident from an outside; and
    an acousto-optic modulator disposed between the first and second mirrors and configured to form a mode-locked signal from the laser light when an ON voltage signal is applied to the acousto-optic modulator and to form a Q-switched signal from the laser light when an OFF voltage signal is applied to the acousto-optic modulator,
    wherein some of the laser light is output through either the first or second mirror to outside the resonator.

2. The pulse laser apparatus of claim 1, further comprising an etalon configured to adjust a pulse width of the laser light.

3. The pulse laser apparatus of claim 2, wherein the etalon is a parallel-plane plate having a uniform reflectivity, the parallel-plane plate being an optical device having an increased reflectivity by depositing a dielectric multi-layered thin film on one or both sides of a parallel-plane plate of glass or crystal, and
    wherein a wavelength width of the laser light is adjusted by a reflectivity, a thickness, and a refractive index of the etalon by limiting a transmittance wavelength bandwidth when the laser light is transmitted to the etalon.

4. The pulse laser apparatus of claim 2 or 3, wherein the etalon has at least one etalon, and the pulse width of the laser light is adjusted by selectively using the etalons having different properties inside or outside the resonator.

5. The pulse laser apparatus of claim 2 or 3, wherein the pulse width is adjusted in a range of 10 ps to 10 ns.

6. The pulse laser apparatus of claim 1, wherein the gain medium includes an Alexanderite rod.

7. The pulse laser apparatus of claim 1, wherein the acousto-optic modulator is configured such that the mode-locked and Q-switched signals are output in a burst mode by controlling the ON or OFF voltage signals and applying the ON or OFF voltage signal to the acousto-optic modulator.

8. The pulse laser apparatus of claim 1, wherein when some of the laser light is output through either the first mirror or second mirror, the number of the output Q-switched pulses is adjusted by using a burst mode or shutter.

\* \* \* \* \*